United States Patent
Kim et al.

(10) Patent No.: US 9,106,413 B2
(45) Date of Patent: Aug. 11, 2015

(54) METHOD AND APPARATUS FOR RESILIENT END-TO-END MESSAGE PROTECTION FOR LARGE-SCALE CYBER-PHYSICAL SYSTEM COMMUNICATIONS

(71) Applicant: Alcatel-Lucent USA Inc., Murray Hill, NJ (US)

(72) Inventors: Young Jin Kim, Basking Ridge, NJ (US); Vladimir Y. Kolesnikov, Jersey City, NJ (US); Marina Thottan, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 57 days.

(21) Appl. No.: 13/837,440

(22) Filed: Mar. 15, 2013

(65) Prior Publication Data

US 2014/0129838 A1    May 8, 2014

Related U.S. Application Data

(60) Provisional application No. 61/721,651, filed on Nov. 2, 2012.

(51) Int. Cl.
*H04L 9/08* (2006.01)
*H04L 9/14* (2006.01)
(Continued)

(52) U.S. Cl.
CPC .............. *H04L 9/0869* (2013.01); *H04L 9/32* (2013.01); *H04L 9/3213* (2013.01);
(Continued)

(58) Field of Classification Search
CPC ....... H04L 63/062; H04L 67/26; H04L 63/08; H04L 63/0807; H04L 63/104; H04L 9/3242; H04L 63/0869

USPC .......................................................... 713/171
See application file for complete search history.

(56) References Cited

U.S. PATENT DOCUMENTS

| 2006/0209868 A1* | 9/2006 | Callaghan ..................... 370/428 |
| 2011/0158410 A1 | 6/2011 | Falk et al. |
| 2011/0167272 A1* | 7/2011 | Kolesnikov ................... 713/171 |

FOREIGN PATENT DOCUMENTS

WO    WO2011009041 A2    1/2011

OTHER PUBLICATIONS

NIST, AES Key Wrap Specification, NIST Computer Security Division [online], Dec. 2001 [retrieved on Aug. 25, 2014]. Retrieved from the Internet< http://csrc.nist.gov/groups/ST/toolkit/documents/kms/key-wrap.pdf>.*

(Continued)

*Primary Examiner* — Eleni Shiferaw
*Assistant Examiner* — David Massie
(74) *Attorney, Agent, or Firm* — M. J. Hodulik

(57) ABSTRACT

To address the security requirements for cyber-physical systems, embodiments of the present invention include a resilient end-to-end message protection framework, termed Resilient End-to End Message Protection or REMP, exploiting the notion of the long-term key that is given on per node basis. This long term key is assigned during the node authentication phase and is subsequently used to derive encryption keys from a random number per-message sent. Compared with conventional schemes, REMP improves privacy, message authentication, and key exposure, and without compromising scalability and end-to-end security. The tradeoff is a slight increase in computation time for message decryption and message authentication.

9 Claims, 4 Drawing Sheets

THE SIMPLIFIED SYSTEM MODEL OF A LARGE-SCALE CPS

(51) Int. Cl.
*H04L 9/32* (2006.01)
*H04L 29/06* (2006.01)

(52) U.S. Cl.
CPC ............ *H04L 9/3236* (2013.01); *H04L 9/3297* (2013.01); *H04L 63/065* (2013.01); *H04L 63/0884* (2013.01); *H04L 2463/061* (2013.01)

(56) References Cited

OTHER PUBLICATIONS

The AES-XCBC-PRF-128 Algorithm for the Internet Key Exchange Protocol (IKE), Internet Engineering Task Force [online], Feb. 2006 [retrieved on Aug. 25, 2014]. Retrieved from the internet:< http://tools.ietf.org/html/rfc4434>.*
S. Kent, "IP Encapsulating Security Payload," IETF RFC 4301, Dec. 2005. pp. 1-90.
T. Dierks and E. Rescorla, "The Transport Layer Security (TLS) Protocol," IETF RFC 5246, Aug. 2008. pp. 1-93.
M. Baugher et al, "The Secure Real-time Transport Protocol (SRTP)", IETF 3711, Mar. 2004. pp. 1-53.
E. Lee, "Cyber Physical Systems: Design Challenges", IEEE Symposium on Object Oriented Real-Time Distributed Computing (ISORC), May 2008. pp. 363-369.
NASPI, "Data bus technical specifications for North American Synchophasor Initiative Network," May 2009, North American SynchroPhasor Initiative. (May 2009) 172 pages.
A. Perrig et al, "Efficient and Secure Source Authentication for Multicast", Internet Society NDSS, Feb. 2001. 12 pages.
N. Modadugu and E. Rescorla, "The design and implementation of datagram TLS," Network and Distributed System Security Symposium, Feb. 2004. 13 pages.
NIST, "Announcing the advanced encryption standard (AES)," 2001, 51 pgs.
C. Kaufman et al, "Internet Key Exchange Protocol Version 2 (IKEv2)," IETF RFC 5996, Sep. 2010. 138 pages.
P. Zimmermann et al, "ZRTP: Media Path Key Agreement for Unicast Secure RTP," IETF RFC 6189, Apr. 2011. 115 pages.
NIST SGIP, "Role of IP in the Smart Grid," Jul. 2011,http://collaborate.nist.gov/ twiki-sggrid /bin/view/SmartGrid/PAP01InternetProfile. 15 pages.
"Texas Instruments MSP430 product brochure," 2011, available online at: http://www.ti.com/lit/sg/slab034u/slab034u.pdf. 21 pages.
R. Arends et al, "DNS Security Introduction and Requirements," IETF RFC 4033, Mar. 2005. 19 pages.
P. Eugster et al, "The Many Faces of Publish/Subscribe," ACM Computing Surveys, vol. 35, No. 2, 2003. pp. 114-131.
J. Bacon et al, "Access control in publish/subscribe systems," ACM International Conference on Distributed Eventbased Systems, Jul. 2008. pp. 23-24.
Y-J. Kim, J. Lee, G. Atkinson, H. Kim and M. Thottan, "SeDAX: A secure, resilient and scalable platform", IEEE Journal on Selected Areas in Communications (JSAC), Jul. 2012. pp. 1119-1136.
C. K. Wong et al, "Secure group communications using key graphs", IEEE/ACM Trans. Networking., vol. 8, No. 1, Feb. 2000. pp. 16-30.
P. Eronen et al,"Pre-Shared Key Cipher suites for Transport Layer Security (TLS)," IETF RFC4279, Dec. 2005. 15 pages.
W. Barker, "Recommendation for the Triple Data Encryption Algorithm Block Cipher," NIST special publication 800-67, May 2008. 40 pages.
H. Krawczyk et al, "HMAC: Keyed-Hashing for Message Authentication", IETF RFC 2104, Feb. 1997. 11 pages.
Y.-J. Kim, V. Kolesnikov, H. Kim, and M. Thottan "SSTP: a scalable and secure transport protocol for smart grid data collection," IEEE Smart Grid Comm., Oct. 2011. pp. 161-166.
Donnerhacke et al, "Open PGP (Pretty Good Privacy) Message Format", IETF RFC 4880, Nov. 2007. 90 pages.
Kim, Young-Jin et al, "SSTP: A scalable and secure transport protocol for smart grid data collection", Smart Grid Communications (SmartGridComm), 2011 IEEE International Conference, ISBN: 978-1-4577-1704-8, XP032073362, Oct. 17, 2011, pp. 161-166.
Eronen, P. et al, Pre-Shared Key Cipersuites for Transport Layer Security (TLS); Network Working Group, Request for Comments: 4279, Category: Standards Track, Dec. 1, 2005, XP015043208, pp. 1-15.
Neuman, C. et al, The Kerberos Network Authentication Service (V5); Network Working Group, Request for Comments: 4120, Category: Standard Track, Jul. 1, 2005, XP015041882, pp. 1-138.
"Announcing the Advanced Encryption Standard (AES)", Federal Information Processing Standards Publication 197, U.S. Dept. of Commerce, Washington, DC, US., Nov. 26, 2001, XP-00298399, pp. i,ii,iii,iv,1-47.
PCT International Search Report dated Jul. 7, 2014 (PCT/US2013/067372) 4 pages.

* cited by examiner

THE SIMPLIFIED SYSTEM MODEL OF A LARGE-SCALE CPS

A TYPICAL CONFIGURATION OF IPsec TUNNELS

LINK-BY-LINK SECURE SESSIONS

PUB-SUB GROUP COMMUNICATIONS FOR A CPS

OUR SYSTEM MODEL OF PUB-SUB GROUP COMMUNICATIONS

E2E MESSAGE CONFIDENTIALITY OF REMP

MESSAGE AUTHENTICATION LEVERAGING MESSAGE BROKERS

METHOD AND APPARATUS FOR RESILIENT END-TO-END MESSAGE PROTECTION FOR LARGE-SCALE CYBER-PHYSICAL SYSTEM COMMUNICATIONS

TECHNICAL FIELD

This invention relates generally to machine-to-machine communications systems and more particularly to group data collection systems for cyber-physical systems, such as a smart electrical grid.

BACKGROUND OF THE INVENTION

Conventional point-to-point schemes such as IPSec (IP Security), TLS (Transport Layer Security), or SRTP (Secure Real-time Transport Protocol) are widely employed for secure protection of Internet traffic. However, the point-to-point schemes are inappropriate for a large-scale CPS where centralized computation servers continuously collect fixed-size data from a massive number of embedded devices attached to the CPS infrastructure, perform real-time data analysis, and, if necessary, send control commands to embedded devices.

First, due to their stateful property, centralized computation servers have to maintain security state per their associated embedded devices. i.e., each server needs O(NL)—memory space where N is the number of devices associated with the server and L is the size of security state. This raises server-side scalability issues for association management, performance, and restoration from failures. Next, the servers have a dependency on certificates or public-key operations for node authentication and key distribution. However, public-key based operations incur almost a hundred times more computing resources than symmetric-key operations and the size of the certificate chains is typically greater than 2K bytes. Therefore, it is difficult to implement these protocols on end devices with constrained computing power or bandwidth.

By contrast, conventional group security schemes which address the limitations of the point-to-point schemes have the following limitations. First, legitimate publishers in a group can listen to messages from other publishers in the group (privacy violation). i.e., conventional group security schemes cannot be used for privacy-conserving infrastructures such as smart metering. Second, compromised subscribers in a group can send messages to other subscribers since they can disguise as legitimate publishers (message authentication problem). This is a well-known open problem in group communications. Third, accidental or incidental exposure of a group encryption key to attackers may result in whole system failures (key exposure resilience problem). Lastly, group encryption keys must be updated to ensure forward-backward secrecy whenever a member joins or leaves the group (key refreshment problem). For a group with N members, refreshing a key needs O(N) message exchanges in a brute-force fashion and O(log N) in tree-based approaches such as LKH (Logical Key Hierarchy). However both O(N) message exchanges and key tree managements are costly for a CPS communication network that consists of a large number of embedded devices and is likely to be built over multiple access technologies including PLCs (Power Line Communications) and IEEE 802.15.4. Accordingly, there is a need for an improved group security communications scheme.

SUMMARY OF THE INVENTION

An advance is made over the prior art in accordance with the principles of the present invention that is directed to a new approach for an end-to-end (E2E) message protection scheme for large-scale CPSs. Certain embodiments of the invention include a notion and use of the long-term key that is given on per node basis; this long term key is assigned during the node authentication phase and is subsequently used to derive encryption keys from a random number per-message sent. Certain embodiments include a notion and use of E2E authenticators. For a message sent, its E2E authenticator consists of the sender's identity and a MAC (e.g., HMAC) of the message. Certain embodiments also include a notion and use of message brokers (trusted intermediate parties placed in protected network locations) that multicast messages from publishers in a group to subscribers in the group. The use of trusted message brokers allows us to drastically reduce the overheads of secure group communication.

Certain embodiments of the invention achieve privacy, message authentication, and key exposure, without compromising scalability and end-to-end security, compared with existing security solutions. Certain embodiments include the design of a novel strong E2E message protection scheme for large-scale CPSs. Our scheme eliminates the need for supporting costly solutions such as IPsec, TLS, or SRTP. In certain embodiments a security extension addresses message authentication problems that are known to be hard. One important performance benefit of the O(1)-state concept is that message flooding from a massive number of embedded devices during session reestablishment following server restarts or failures can be avoided.

To address the security requirements for cyber-physical systems, embodiments of the present invention include a resilient end-to-end message protection framework, termed Resilient End-to End Message Protection or REMP, exploiting the notion of the long-term key that is given on per node basis. This long term key is assigned during the node authentication phase and is subsequently used to derive encryption keys from a random number per-message sent. Compared with conventional schemes, REMP improves privacy, message authentication, and key exposure, and without compromising scalability and end-to-end security. The tradeoff is a slight increase in computation time for message decryption and message authentication.

BRIEF DESCRIPTION OF THE DRAWING

The teachings of the present invention can be readily understood by considering the following detailed description in conjunction with the accompanying drawings, in which.

DETAILED DESCRIPTION

Today many countries, cities, and utilities are deploying nationwide or statewide critical infrastructures that incorporate Cyber-Physical Systems (CPS). Examples of such critical cyber-physical infrastructures are national disaster control systems, transportation networks, gas and water networks, and power grids. Using cyber-physical systems is expected to significantly improve safety, reliability, and efficiency in operating critical infrastructures. Aligned with this increasing deployment of CPS, US government research agencies have identified CPS as a key area of research since late 2006. By definition a full-fledged CPS integrates computing and communication capabilities with the monitoring and control of physical entities in real world. The CPS for the critical infrastructures (hereafter called large scale CPS) must be secure, reliable, and operated in real-time, 1 otherwise it can present serious economic and safety hazards.

Figure 1:
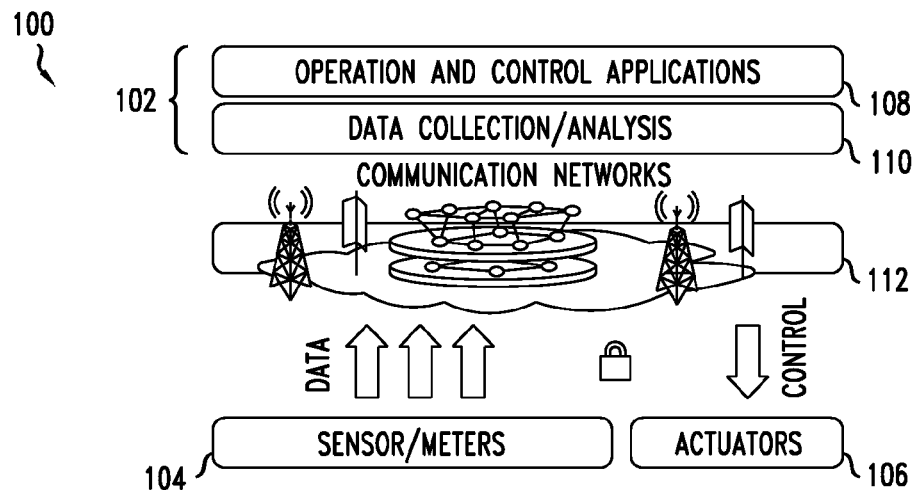
FIG. 1 shows an exemplary embodiment of a simplified model for a large-scale Cyber-Physical System (CPS)

Referring to FIG. 1, there is shown a simplified representation of a system model for exemplary large scale CPS 100. Unlike standalone embedded systems, a large-scale CPS can be modeled as a machine-to-machine communication system that combines a central control facility 102 to provide intelligence, sensors 104 as physical inputs, and actuators 106 for implementing the control operation. The central control facility includes operation and control applications 108 and data collection/analysis functions 110, wherein the central control facility is coupled to the sensors and actuators through a communications network 112. In a large-scale CPS, the massive number of embedded sensors continuously publishes data; their associated control facility collects the generated data for performing real-time data analysis and if necessary sends control messages to the actuators where physical actions will be executed. An example of CPS systems is the power grid where through the use of smart meters a utility can cost-effectively maintain the balance between power load and supply through accurate and timely reporting of power loads; real-time analysis of data collected from embedded sensors and resulting closed loop controls that can effectively respond to contingencies such as grid faults or outages without immediate human intervention.

Figure 2:
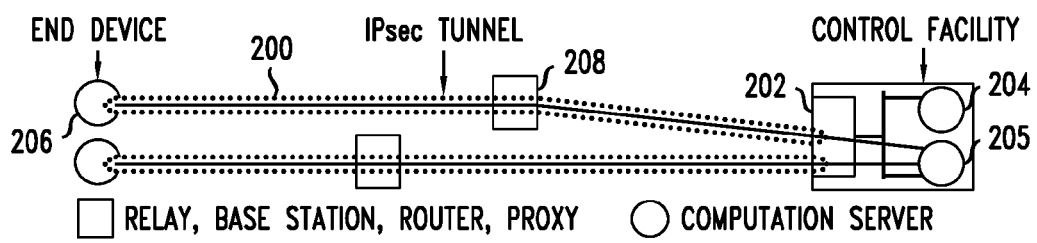
FIG. 2 shows an exemplary configuration of IPsec tunnels in an exemplary CPS.

Compared with standalone embedded systems, such large scale CPS require trustworthy communications as their elements are geographically distributed in a field area network and thus can be exposed to adversaries who are external to the CPS. The communication network for the CPS must be physically or virtually isolated from public networks due to the significant security and performance issues that are encountered if mission critical messages are multiplexed with public data traffic. However, just network isolation alone is not sufficient to ensure trustworthy communications since adversaries can easily exploit security holes in control facilities or intermediate nodes such as routers, base stations, relays, aggregators, etc. For example, consider security threats in a typical control facility that computing machines in a control facility communicate with end devices through gateway routers in the subnet where the computing machines are located. Assume that messages between end devices and their associated control facility are protected by IPsec tunnels. As illustrated in FIG. 2, by typical security operation practices, each IPsec tunnel 200 is likely to be terminated at a gateway 202 rather than the computing server 204 at the control facility 205 which is the expected destination for messages from an end device 206. In addition, a message may also pass through a number of other nodes, such as relays, base stations, routers or proxies 208, for example. The reason for termination of IPsec tunnels at the gateway is primarily due to performance and management issues. In such cases, messages between the computing server 204 and the gateway 202 are unprotected unless there are other security solutions that protect the confidentiality and integrity of the messages. The corruption of the messages could be caused by internal adversaries including compromised employees and computer malwares. In addition, in some critical infrastructures for smart metering or synchophasor data sharing across multiple utilities, protecting privacy among electric consumers or utilities is identified as a nonnegotiable security requirement for large-scale CPS communications.

We emphasize from the above scenarios that large-scale CPSs must strongly protect messages against cyber attacks on an end-to-end (E2E) (versus link-by-link) aspect irrespective of whether the network is isolated from public networks. Without the E2E security, the credibility of the CPS is questionable and could lead to safety hazards or privacy violations. Thus, the challenge is to design E2E security for large-scale CPS communications that are scalable on aspects of message decryption and integrity. Conventional group security schemes which have scalability advantages reveal weak security strength on aspects of privacy, message authentication, and key exposure resilience. It is in this context that we consider the specific problem of designing scalable message protection schemes that ensure strong E2E confidentiality and integrity. We also consider computational overheads to understand the impact of security on resource-constrained access networks and computing devices. Exemplary embodiments of the present invention set forth a resilient E2E message protection (REMP) framework for CPS communications that addresses the above requirements. An exemplary aspect of REMP is that, for a communication group exchanging similar messages, receivers do not need to keep any state for security per-sender. Some other exemplary aspect of the invention include: design of a novel and strong E2E message protection scheme for large-scale CPSs. The proposed scheme eliminates the need for supporting costly solutions such as IPsec, TLS, or SRTP, In addition embodiments of the present invention including a security extension address a message authentication problem that is known to be hard, see, for example, A. Perrig, R. Canetti, D. Song, and J. D. Tygar, "Efficient and Secure Source Authentication for Multicast", Internet Society NDSS, February 2001. One important performance benefit of the O(1)-state concept of REMP is that message flooding from a massive number of embedded devices during session reestablishment following server restarts or failures can be avoided.

Properties of Large-Scale CPS Communications

Figure 3:
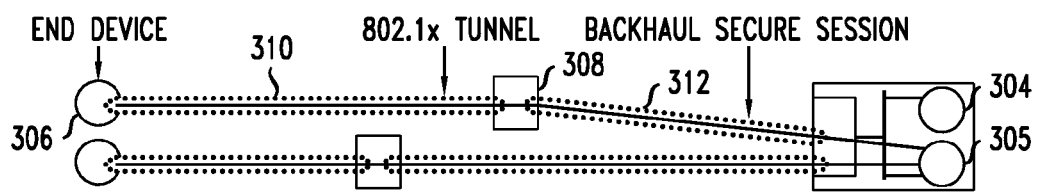
FIG. 3 shows an exemplary representation of link-by-link secure sessions in an exemplary CPS.

In the following, some of the characteristic properties of CPS communications that are relevant for designing the REMP are described. First, communications between machines that publish and consume data are governed by a single pre-assigned administration, e.g., smart metering or distribution automation are typically operated by a single utility; wide-area situation monitoring that spans across multiple utilities can be operated by a single independent organization. Second, in a typical CPS, fixed-size messages are published by a large number of embedded devices and this data publishing dominates the communication network, e.g., in the UK's Smart Metering project approximately 53 million smart meters will be rolled out to cover all households and most businesses. Third, CPS communication sessions for safe delivery of data and control messages need to be persistently-lived. The persistent association is necessary for minimizing message delivery delay and for avoiding computing and communication overheads required per session establishment procedure. Fourth, embedded devices are typically purposebuilt machines with constrained computing resources. Control facilities on the other hand are made up of high-performance machines since the high volume of data that is collected from the massive number of sensors should be processed in a timely fashion. Note that this asymmetry in the availability of computing resources must be taken into account when designing security schemes. Scalability is a major consideration for control center entities that have sufficient computational power while for computing constrained entities light-weight computation is critical. Resilience to attacks is however an essential requirement for all devices. Lastly, large-scale CPS communications could be deployed over multiple access technologies such as IEEE 802.15.4/802.11mesh, power-line communications (PLC), Long Term Evolution (LTE), or optics. Each access technology has its own authentication and confidentiality schemes. However, link-level security schemes provided by access technologies are limited in terms of ensuring E2E message protection as they cannot guarantee confidential communications among end-point devices through intermediate communication devices such as relays, base stations, or routers. Consider the scenario shown in FIG. 3 that a message from an end device 306 encrypted by IEEE 802.1X (used for mesh network security) is securely delivered over a radio mesh network 310 where the message is destined for the control facility 305 and a computation server 304. The message is then decrypted at a gateway router 308 and transmitted over a backhaul network 312 using the encryption scheme of the backhaul network. It is possible that the gateway router can be exploited as a security hole through mechanisms such as hidden backdoors or a virus. Therefore, it is critical that CPS supports security technologies that ensure E2E security. It becomes a mandatory requirement for eliminating possible security holes among end-point devices.

Message Protection Schemes

To the best of the inventors' knowledge, none of the existing well-known security schemes meets the requirements for large-scale CPSs. Currently there are four point-to-point security protocols that are widely used for Internet communications and are possible candidates for CPS communications—Ipsec, see, for example, S. Kent, "IP Encapsulating Security Payload," IETF RFC 4301, December, 2005, TLS, see, for example, T. Dierks and E. Rescorla, "The Transport Layer Security (TLS) Protocol," IETF RFC 5246, August, 2008, DTLS, see, for example, N. Modadugu and E. Rescorla, "The design and implementation of datagram TLS," Network and Distributed System Security Symposium, February, 2004, and SRTP, see, for example, M. Baugher, D. McGrew, M. Naslund, E. Carrara, and K. Norrman, "The Secure Real-time Transport Protocol (SRTP)", IETF 3711, March 2004. These security protocols have no serious weakness since each secure session is protected using a secure key. The strength of these security schemes relies on strong ciphers such as AES, see, for example, NIST, "Announcing the advanced encryption standard (AES)," 2001. However, the management of their session keys reduces the scalability and extensibility required to support large-scale CPS communications from on E2E aspects.

IPsec (IP Security) is a protocol suite to protect messages for virtual private networks or remote user access, using message authentication and encryption in an IP-layer session. IPsec performs mutual-authentication between two communicating parties at the beginning of a session and then distributes keys to be used for the session. This is accomplished through external protocols such as IKE, see, for example, C. Kaufman, P. Hoffman, Y. Nir, P. Eronen, "Internet Key Exchange Protocol Version 2 (IKEv2)," IETF RFC 5996, September 2010 that require certificates and public-key cryptography, and are therefore computation-intensive.

TLS (Transport Layer Security) and DTLS (Datagram TLS) protect application protocols such as HTTPS or SNMP above the transport-layer (TCP for the former and UDP for the latter), using symmetric key encryption for confidentiality, and message authentication codes for integrity. These inherently support node authentication and key distribution using certificates and public key cryptography. Hence, they are also computation-intensive.

SRTP (Secure Real-time Transport Protocol) safely protects the RTP designed for supporting real-time and jitter-sensitive applications such as IP-telephony. For communication resource constrained environments, SRTP has advantages over IPSec, TLS, or DTLS4. It relies on external key management protocols such as ZRTP, see, for example, P. Zimmermann, A. Johnston, Ed., J. Callas, "ZRTP: Media Path Key Agreement for Unicast Secure RTP," IETF RFC 6189, April 2011, to setup one master key for deriving session key. However, it needs time-synchronization for key derivation.

Limited scalability: All the above protocols have one limiting property for application to large-scale CPS communications: a sender must know its intended receiver's contact information before initiating communications and a receiver must maintain one security association per-sender during communications. For example, consider the scenario of sensor data collection. For ensuring E2E secure communications, computation servers in a control facility must maintain O(N) secure sessions where N is the number of end devices embedded in the CPS. However, if N is large (e.g., in the order of millions in smart metering), due to hardware limitations secure sessions will be terminated at gateway routers or proxy servers in the control facility rather than computation servers. Further, in computation servers, if a big chunk of memory is occupied by security tasks assigned to messages from O(N) end embedded devices, computation intensive activities such as real-time data analysis and closed loop control algorithms may face a temporary shortage of runtime memory during their computation which could result in missed deadlines. Also exposing computation servers to a large number of end devices must be avoided since adversaries can easily develop cyber attacks via end devices. In short, enforcing E2E message protection to eliminate security holes necessarily involves deploying cost effective scalability in the system. All of the above referred protocols can also incur control message flooding when either non-end point or end point servers managing a large number of secure sessions are restarted for upgrading or has abruptly failed. End devices associated with these servers will simultaneously send thousands of control messages to reestablish their secure sessions as soon as possible.

Overhead and extensibility requirements: As described above, all protocols except for SRTP have a dependency on certificates or public-key operations for node authentication and key distribution. However, public-key based operations incur almost a hundred times more computing resources than symmetric-key operations and the size of the certificates is typically greater than 2K bytes. Therefore, it is difficult to implement these protocols on end devices with constrained computing power or bandwidth, e.g., sensors with 16-bit 8 MHz processors and PLC or IEEE 802.15.4 modules.

In a large-scale CPS, for extensible deployments, a newly installed or rebooted embedded device must have knowledge of the name of its pre-assigned control facility rather than the IP address of an end-point server. This is necessary to establish the necessary security associations with the CPS. Otherwise, large scale distributed embedded devices must perform the address resolution for multiple end-point servers. This poses a challenge for the seamless replacement of end-point servers. Using point-to-point security for CPS communications needs a secure name resolution system such as DNS-SEC, see, for example, R. Arends, R. Austein, M. Larson, D. Massey, S. Rose, "DNS Security Introduction and Requirements," IETF RFC 4033, March 2005. However, DNSSEC relies on certificates and public-key cryptography for ensuring message authentication and furthermore does not support confidentiality for DNSSEC messages.

Group Communication Security

Figure 4:
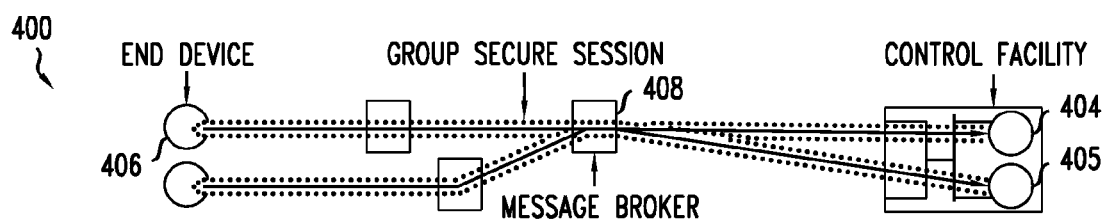
FIG. 4 shows an exemplary representation for publisher-subscriber (pub-sub) group communications in an exemplary CPS.

In the context of publish-subscribe (hereafter caller pub-sub) communications, communication security has different pros and cons in terms of message protection. Unlike general group communications such as multimedia bulletin boards or video conferences, each member in a pub-sub group either sends messages (as a publisher) or receives messages (as a subscriber). i.e., pub-sub communications refer to unidirectional many-to-many communications among publishers and subscribers. See, for example, FIG. 4 which illustrates a communications network 400 where a number of end point devices 406 can communicate with a number of end point computing servers 404 at control facility 405. Message broker 408 is included in the network at a point between the end point devices 406 and the servers 404 as will be discussed. Consider the incorporation of pub-sub communications into a CPS where all embedded devices are divided into a small number of groups, and end-point servers participate in all the groups. We can find significant improvements in scalability, extensibility and overhead on aspects of E2E message protection since, for a group, all members share one symmetric group key for message encryption, or share public keys. Pub-sub communications inherently protect end-point servers in a control facility against attacks that can be launched from embedded devices since the devices have no knowledge of the end-point servers and the end-point servers do not setup associations with the devices themselves due to the time and space decoupling between publishers and subscribers. Furthermore, pub-sub systems can be designed with no dependency on name resolution systems such as DNSSEC. However, conventional security schemes for pub-sub communications introduce other limitations on message protection due to the use of either one single symmetric key per group or public keys despite ensuring member authentication at group join time. For the use of one symmetric key per group, we identify the following four limitations. First, legitimate publishers in a group can listen to messages from other publishers in the group (privacy violation). i.e., conventional group security schemes cannot be used for privacy-conserving infrastructures such as smart metering. Second, compromised subscribers in a group can send messages to other subscribers since they can disguise themselves as legitimate publishers (message authentication problem). This is a well-known open problem in group communications. Third, accidental or incidental exposure of a group encryption key to attackers may result in whole system failures (key exposure resilience problem). Lastly, group encryption keys must be updated to ensure forward-backward secrecy whenever a member joins or leaves the group (key refreshment problem) see, for example, C. K. Wong, M. Gouda, and S. S. Lam, "Secure group communications using key graphs", IEEE/ACM Trans. Networking, vol. 8, no. 1, February, 2000). For a group with N members, refreshing a key needs O(N) message exchanges in a brute-force fashion and O(log N) in tree-based approaches such as LKH. However both O(N) message exchanges and key tree managements are costly for a CPS communication network that consists of a large number of embedded devices and is likely to be built over multiple access technologies including PLCs and IEEE 802.15.4. For the use of public keys, the following two limitations are identified. First, public-key encryptions are difficult to implement on low-powered embedded devices due to their intensive computation. Second, public-key encryptions waste limited communication resources. Consider two end-point servers that are interested in data from embedded devices (See FIG. 4). Public keys of the end-point servers are likely to be distributed to embedded devices since the number of end-point servers is typically much less than the number of embedded devices. An embedded device must twice encrypt the same data using the two public keys and send the twice encrypted data for both the servers to decrypt the data.

Design Of REMP

We present the design of REMP in a top-down modular manner for simplicity of presentation and understanding. The design goals of REMP are to improve message protection strength in terms of privacy, origin authentication, key exposure resilience, and key refreshment, and to accommodate resource constrained environments, while preserving the scalability and extensibility inherited from pub-sub group communications7.

Symmetric-key only approach for lightweight considerations: As discussed, in CPS communications, end devices communicate with end servers under a single administrative domain. Thus, one pre-shared key (PSK), see, for example, P. Eronen and H. Tschofenig, "Pre-Shared Key Cipher suites for Transport Layer Security (TLS)," IETF RFC4279, December, 2005 per end device and symmetric ciphers such as AES, see, for example, NIST, "Announcing the advanced encryption standard (AES)," 2001 or 3DES, see, for example, W. Barker, "Recommendation for the Triple Data Encryption Algorithm Block Cipher," NIST special publication 800-67, May 2008 will suffice. In this setting, using costly public-key credentials has no benefit of system-wide reduction in the number of keys. REMP uses only symmetric-key operations for all security extensions.

One encryption key per-message: Each publisher executes encryption using a separate key per message sent. This approach addresses privacy among publishers in a group. Further, since it provides forward-backward secrecy, key update caused by new member joins can be avoided and key exposure resilience is inherently improved. Furthermore, it prevents attackers from collecting and replaying large amounts of cipher text encrypted with one single session key on a per-group basis.

Subscriber's state independent of the number of publishers: Our basic idea is that subscribers compute the decryption key whenever they receive a message. This capability is enabled by the use of a long-term master key. In this way, a subscriber does not need to keep security state per-publisher. Additionally, this idea helps avoid extreme overloading in the face of subscriber restarts or failures.

Figure 5:
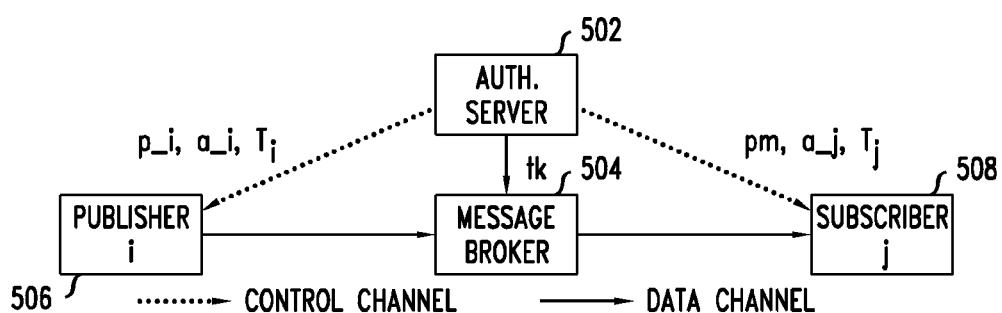
FIG. 5 shows an exemplary embodiment for a system model of pub-sub group communications for an exemplary CPS according to the present invention.

Message origin authentication extension: Referring to FIG. 5, to tackle message origin authentication that is known to be a hard problem, we exploit the notion of an E2E authenticator 502 and message brokers 504 that multicast messages from publishers in a group 506 to subscribers in the group 508. For a message sent, its E2E authenticator consists of the sender's identity and a MAC message authentication code (e.g., HMAC [20]) of the message.

Architecture Overview

We begin with the discussion of our pub-sub communication framework that is leveraged by REMP. Consider FIG. 5. For all pub-sub groups, authentication servers 502 are responsible for member authentication and key distribution to members. In a group, each member (publisher, subscriber, or message broker) must be authenticated and then assigned keys. A message broker 504 authenticated for a group maintains security state for subscribers 508 authenticated for that group. Whenever a message broker receives a message, it verifies if the source of the message is a publisher 506 permitted to access the group and so filters out any unauthenticated message. We emphasize that one of our design principles is to improve E2E confidentiality and integrity in pub-sub communications. Thus, in a group, messages encrypted and hashed by publishers can be decrypted and hashed by only subscribers. Message brokers in the group are not allowed or able to decrypt the message. Each end node can participate in more than one group but can only act either as a publisher or subscriber in each group.

Design Details

PSK-based member authentication: For participating in a certain group, each member must be authenticated by an authentication sever under the same administrative domain. Conventional approaches that use certificates and public-key ciphers or require many message exchanges, are not suitable for CPS communications where end devices or access networks can be resource-constrained. By contrast, PSK-based approaches are appropriate for CPS communications, by virtue of the properties previously described. See, for example, Y.-J. Kim, V. Kolesnikov, H. Kim, and M. Thottan, "SSTP: a scalable and secure transport protocol for smart grid data collection," IEEE Smart Grid Comm., October 2011 for details. An authenticated member can safely receive information over a secure channel with its associated authentication server.

Long-term key assignment and access-ticket: Referring to FIG. 5, in combination with Table I, for a group, authentication servers 502 create and distribute four kinds of long term keys: a single publishing master key, a publishing key per publisher, a single access-ticket key, and an authentication key per member, as shown. For a group m, given a single publishing master key pm, a publisher 506 with identity i is assigned a publishing key $p\_i=AES_{pm}(i)$. Security properties of Advanced Encryption Standard (AES) function guarantee that none of the publishing keys can be distinguished from a random string, even if the adversary obtains publishing keys of all other publishers. Thus, these keys are safe to use. On the other hand, the publishing master pm is given to all subscribers. p_i and pm are subsequently used to compute keys for message encryption and decryption respectively.

Windows. An authenticated member with identity i is given access-ticket $T_i$ and authentication key a_i, as shown in FIG. 5. $T_i$ is a cipher text that contains identity i, authentication key a_i, and access-right, and whose encryption is done by a single access-ticket key tk assigned to group m.

Figure 6:
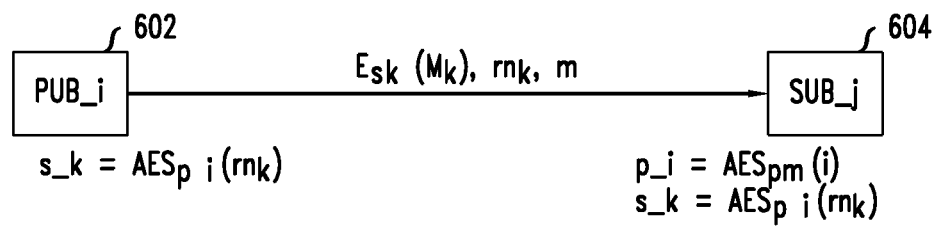
FIG. 6 shows an exemplary embodiment for a message confidentiality scheme of REMP.
Figure 7:
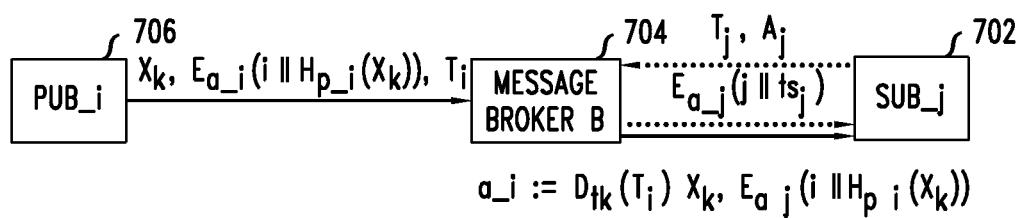
FIG. 7 shows one exemplary embodiment for message authentication in a CPS leveraging message brokers.

E2E message confidentiality for privacy awareness: We compute encryption keys using a key derivation function for message encryption and decryption. A key is pseudo-randomly generated from a publishing key and a random number. As illustrated in FIG. 6, given a publishing key p_i, for a random number $rn_k$, a publisher i 602 computes the key $s\_k=AES_{p\_i}(rn_k)$. On receiving an encrypted message from publisher i, a subscriber 604 first computes the publishing key p_i using the publishing master key pm he was given by applying the AES function; from p_i he computes the decryption key s_k. Thus, it need not store this session key, since he can readily compute it given a publishing key and a random number. In addition to session key derivation, publishing keys support E2E message integrity using MAC functions such as HMAC, as shown in FIG. 7. Using key derivation functions over publishing keys and random numbers improves privacy among publishers in a group.

Message authentication extension: We now describe a security extension for addressing sender authentication: a compromised subscriber in a group can disguise itself as a legitimate publisher in the group since it has a publishing master key for the group. For a subscriber with identity j of group m, given a message broker B (where details of message broker selection would be understood by those skilled in the art [16]), we first establish one security association between B and j. Then, whenever B receives a message, it verifies whether the message comes from a publisher permitted for group m. If so, it sends the message over the security association between B and j. Thus, subscriber j can ensure that any message received really comes from its associated message broker.

Consider FIG. 7. After it is authenticated, subscriber j 702 generates encryption $A_j$, which contains identity j, time stamp $ts_j$, and j's address. $A_j$ is encrypted with j's authentication key a_j. Subscriber j sends a control message containing $A_j$ and j's access-ticket $T_j$ (given by auth. server) to message broker B 704, who holds an access-ticket key tk given by an authentication server (see FIG. 5). When the message reaches message broker B, it can compute both the authentication key a_j and access right of subscriber j from $T_j$ using tk, and then verify $A_j$ using a_j. Upon verification, message broker B can establish a security association with subscriber j.

TABLE 1

Terminologies used for explaining REMP.

| | | | |
|---|---|---|---|
| m | A group identity | tk | A single access-ticket key of m |
| Pub_i | Publisher with identity i | pm | A single publishing master key of m |
| Sub_j | Subscriber with identity j | p_i | A publishing key of Pub_i |
| ‖ | Concatenate | a_i | An authentication key of Pub_i |
| $E_x$ | Encryption using key x | a_j | An authentication key of Sub_j |
| $D_x$ | Decryption using key x | $T_i$ | i's access-ticket, $E_{tk}$(i ‖ a_i ‖ 'W'). |
| $M_k$ | The k-th message of Pub_i | $T_j$ | j's access-ticket, $E_{tk}$(j ‖ a_j ‖ 'R'). |
| $rn_k$ | The k-th random number | $H_x$ | Cryptographic hashing using key x |
| s_k | A session key for $M_k$ | $ts_j$ | Time stamp of Sub j |
| $X_k$ | $\{E_{s\_k}(M_k), rn_k, m\}$ | $A_j$ | $E_{a\_j}$ (j ‖ $ts_j$ ‖ j's address) |

For message authentication and group access control, we use the notion of "access-ticket" borrowed from Kerberos, see, for example, C. Neuman, T. Yu, S. Hartman, and K. Raeburn, "The Kerberos Network Authentication Service (V5)", IETF RFC 4556, July, 2005 that is widely used in MS For a given authentication key a_i and an encrypted message $X_k:=\{E_{s\_k}(M_k), M_k, m\}$, publisher i 706 creates an E2E authenticator that contains identity i and a cryptographic hash of $X_k$ using its publishing key p_i, i‖$H_{p\_i}(X_k)$, and then encrypts the authenticator using a_i. (A weak form of nonmalleability of the latter encryption is needed and so adversaries can't meaningfully modify a message under encryption. The use of AES as the encryption scheme is sufficient.) $X_k$, the encrypted authenticator, and access-ticket $T_i$ are together sent to message broker B, as shown in FIG. 7. Upon reaching B, we first extract identity i and authentication a_i from Ti using the access-ticket key tk, and then identity i from $E_{a\_i}(i\|H_{p\_i}(X_k))$ using a_i. If the two identities are equal, B newly encrypts the E2E authenticator $\{i\|H_{p\_i}(X_k)\}$ using the authentication key a_j of subscriber j where $X_k$ will be sent. When subscriber j receives $E_{a\_j}(i\|H_{p\_i}(X_k))$ together with $X_k$, it extracts $\{i\|H_{p\_i}(X_k)\}$ using its authentication key a_j. We can finally verify $H_{p\_i}(X_k)$ using the publishing key p_i that can be extracted as shown in FIG. 6.

Replay Attacks

The message broker of REMP is essentially stateless for publishers. We provide a mechanism to protect the broker from replay attacks. First, we note that a publisher's authentication key is unforgeable and with proper formatting and care we can prevent adversaries from presenting an E2E authenticator generated for a publisher id1 as an E2E authenticator for publisher id2. Further, re-encrypting an E2E authenticator without knowledge of an authentication key is not possible either. Hence, the only venue of the replay attack is the verbatim replay of one of the previously encrypted E2E authenticators with a possibly different session message. Recall that each session message is cryptographically hashed with its publisher's publishing key and so is implicitly tied with an E2E authenticator. As a result, such a replay attack can always be detected in subscribers. Thus, the only replay attack that remains to be considered is the verbatim replay of the entire publisher's message. And indeed, our presentation so far is potentially vulnerable to this attack. In our protection method firstly, in typical CPS settings the number of messages that can arrive in a time period of tens of seconds is not very large, and so we can afford to keep the history of their hashes. Thus, for each new message, we will check it against the small recent history of hashes, and reject it if it is found in the history; if not found, we proceed as before. This will protect our systems against accidental replay. As described, we cannot eliminate malicious replay attacks at a protocol level due to our state restriction. Recall, however, that for our application scenarios, data from embedded devices in a critical infrastructure are time stamped. We thus delegate the final timestamp and duplication checks to the application layer, where this can be done much more efficiently.

Security Strength

We now recap the security strength of REMP. First, the long term key generation in REMP is secure due to the properties of the AES function. The follow-up message encryption, based on symmetric ciphers [8] [19] chosen from the standards, is also secure. Next, the derivation of short-term session keys from long-term keys and random numbers results in the following benefits: It prevents attackers from developing attacks by passively collecting large amounts of cipher text encrypted with one long-term session key. Furthermore, it provides forward backward secrecy in the sense that a compromised session key does not compromise other session keys derived from the same long-term key. Another possible scenario is to compromise a subscriber having a single publishing master key for a group. However, this is also practically hard as subscribers are typically located within a security perimeter. Even if such an attack is realized, message integrity of the group is still safe due to our message authentication extension. One remaining potential attack is to compromise each publisher. However, we can confine the effect of such an attack to only the publisher.

Scalability, Extensibility, and Availability

Due to the property that subscribers in a group do not directly communicate with publishers in the group, REMP outperforms most known point-to-point security protocols except for SSTP on aspects of scalability, extensibility, and availability, as shown in Table 2.

TABLE 2

Comparison of REMP against alternatives

| | Point-to-Point | Group Security | REMP |
| --- | --- | --- | --- |
| Memory scale | O(N) in a receiver | O(1) | O(1) |
| Restart of receivers | Control message flooding | Zero control message | Zero control message |
| Seamless deployment | No | Inherently support | Inherently support |
| Privacy-awareness | Inherently-support | No | Support |
| Message Authen. | Support | No[8] | Support |
| Authentication and Key distribution | External protocols or complex proc. | Inherent but public key operations | Inherent and simple symmetric key ops |
| No. of message needed for key update | Typically unnecessary | O(log N) per join or leave | Zero |

Communication Overhead and Computation Time

In terms of communication overhead for message protection, REMP is comparable to alternatives. For a given message, REMP consumes additional bandwidth for three extra fields, 2-bytes for random number, 2-bytes for group identity, and 12-bytes for access-ticket. Note that alternatives except for DTLS run over IP tunnel, TCP, or RTP whose header size is more than 16 bytes. DTLS has 8 bytes extra overhead, compared with TLS. Table 3 shows the extra computations of REMP against alternatives for a given sent message Mk. We note that encryption and decryption for confidentiality and cryptographic hashing for integrity are common across all alternatives. The additional computational burden for REMP stems mostly from processing message authentication. In fact, the performance degradation introduced by REMP is negligible as the speed of symmetric ciphers used for encryption and decryption is in the order of microseconds for small-size data such as $i\|H_{p\_i}(X_k)$ whose typical size is 20 bytes. E.g., the computation time of 20-bytes data is about one microsecond over a 1 GHz processor and one hundred microseconds even over a 10 MHz processor since the symmetric cipher AES is known to spend about 50 clock cycles for encrypting or decrypting one-byte data.

TABLE 3

Additional Computations of REMP against alternatives

| | Publisher | Message broker | Subscribers |
| --- | --- | --- | --- |
| Confidentiality | 1 AES run to compute s k. | None | 2 AES runs to compute s k & pk i. |
| Integrity | None | None | None |
| Authentication | Encrypt $i\|H_{p\_i}(X_k)$ | Decrypt $T_i$ and $E_{a\_i}(i\|H_{p\_i}(X_k))$ Encrypt $i\|H_{p\_i}(X_k)$ | Decrypt $E_{a\_j}(i\|H_{p\_i}(X_k))$ |

Figure 8:
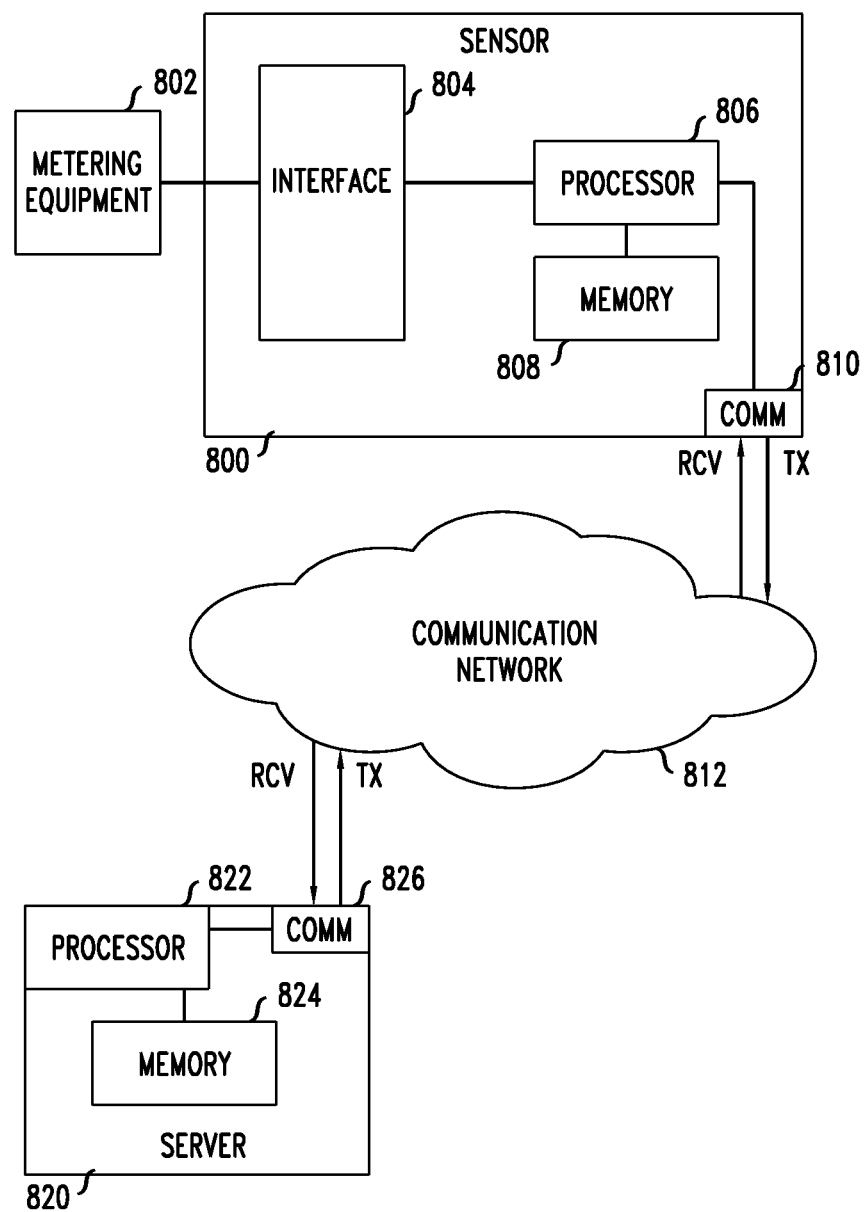
FIG. 8 shows one exemplary embodiment of a high level block diagram of a sensor and server for use in accordance with the methodology of the present invention.

Referring to FIG. 8, there is shown one exemplary embodiment of a sensor 800 and a server 820 as may be used in connection with certain embodiments of the present invention. As shown, the sensor 800 includes a processor 806 and memory 808 (for example, a suitable amount of read only memory (ROM) and random access memory (RAM). As described earlier, the processor and memory may take the form of a microcontroller, for example, one of the TI (Texas Instruments) MSP 830 series microcontrollers. As would be understood, the sensor memory 808 may be programmed with executable code for carrying out the methodology of the present invention as described. The processor 806 is coupled to a metering interface 804 that may include circuitry for interfacing with existing metering equipment. In addition, the processor also couples to a communications interface that in turn couples to a communications network 812. In this manner, metering data from metering equipment 802 may be obtained and transmitted via the communications network to a corresponding server 820 of the respective utility. As would be understood by a person skilled in the art, the sensor may separately couple to the metering equipment as shown, or may be integrated with the metering equipment itself. In addition, other varying embodiments of sensor design and functionality may also be utilized as would be readily understood.

As illustrated, server 820 also includes a processor 822 and associated memory 824. The memory is programmed with executable code in order for the server to carry out the methodology of the present invention as well as other well understood server tasks for a server of this type. The server 820, in addition, includes a communications interface 826 to the communications network 812. The communications interface may include multiple ports and suitable buffering capability, as would be understood by those skilled in the art. Other servers described in connection with the description of the present invention, for example, the authentication and message broker servers and gateways may have a similar structure to the server 420.

Related Work

Some work on message confidentiality can be found in PGP Donnerhacke, H. Finney, D. Shaw, and R. Thayer, "Open PGP (Pretty Good Privacy) Message Format", IETF RFC 4880, November, 2007, and SRTP M. Baugher, D. McGrew, M. Naslund, E. Carrara, and K. Norrman, "The Secure Real-time Transport Protocol (SRTP)", IETF 3711, March 2004. In PGP, each short-term key is encrypted using a receiver's public key and sent together with the message encrypted by the key. So, PGP is inappropriate for multicasting or end devices with restricted computing powers. In SRTP, communicating parties share a master key and extract each short-term key using a key derivation function, the master key, and a sequence number. However, establishing the master key relies on extra protocols such as ZRTP, see, for example, P. Zimmermann, A. Johnston, Ed., J. Callas, "ZRTP: Media Path Key Agreement for Unicast Secure RTP," IETF RFC 6189, April 2011. that need a non-negligible number of control message exchanges. Importantly, the exposure of the master key or out-of-ordered sequencing can result in security failures. In addition, SRTP supports only RTP.

CONCLUSION

In this work, we show that conventional security approaches do not meet the security requirements of large-scale CPSs. Therefore we design the REMP framework that achieves scalability, and overhead reduction, without compromising on the E2E message protection strength.

All of the references cited in the application are incorporated by reference herein to the extent allowable.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Many other modifications and applications of the principles of the invention will be apparent to those skilled in the art and are contemplated by the teachings herein. Accordingly, the scope of the invention is limited only by the claims.

What is claimed is:

1. A method of secure communication between a group of publishers and a group of subscribers in a network, said method comprising the steps of:

assigning by one, or more authentication servers a long-term key on per node basis to said publishers in the group of publishers and subscribers in the group of subscribers during a node authentication phase; and using said long term key to derive encryption keys from a random number per-message set, wherein a publisher in the group of publishers executes encryption using a separate key per message sent and wherein a subscriber in the group of subscribers computes a decryption key when a message is received, computation of said decryption key being enabled by said long-term key that was assigned; and wherein for a group, the authentication servers distribute four kinds of long term keys: a single publishing master key, a publishing key per publisher in the group of publishers, a single access-ticket key, and an authentication key per member and for a group m, given the single publishing master key pm, a publisher in the group of publishers with identity i is assigned a publishing key $p\_i = AESpm(i)$; and wherein message brokers multicast messages from publishers in a group of publishers to subscribers in the group, wherein for publisher subscriber groups, the authentication servers are responsible for member authentication and key distribution to publishers in the group of publishers, subscribers in the group of subscribers and message broker members of the group of publishers and subscribers, wherein in a group, a member is authenticated and then assigned keys; and a message broker authenticated for a group maintaining security state for subscribers authenticated for that group and when a message broker receives a message from a publisher in the group of publishers the message is accompanied by an authentication ticket, the broker then uses the assigned single access ticket key to decrypt the authentication ticket and verifies if the source of the message is a publisher permitted to access the group.

2. The method of claim 1, wherein a publishing master pm is given to all subscribers and p_i and pm are subsequently used to compute keys for message encryption and decryption respectively.

3. A method of secure communication between a group of publishers and a group of subscribers in a network, said method comprising the steps of:

assigning, by one, or more authentication servers a long-term key on per node basis to said publishers in the group of publishers and subscribers in the group of subscribers during a node authentication phase; and using said long term key to derive encryption keys from a random number per-message set, wherein a publisher in the group of publishers executes encryption using a separate key per message sent and wherein a subscriber in the group of subscribers computes a decryption key when a message is received, computation of said decryption key being enabled by said long-term key that was assigned; and wherein for a group, authentication servers distribute four kinds of long term keys: a single publishing master key pm, a publishing key p_i per publisher in the group of publishers, a single access-ticket key tk, and an authentication key per member, a_i for publishers, and, a_j for subscribers, and for a group m, given the single publishing master key pm, a publisher with identity i in the group of publishers is assigned the publishing key p_i=AESpm(i), and access tickets Ti=Etk(i∥a_i∥'W') for publishers with identity i in the group of publishers, and Tj=Etk(j∥a_j∥'R') for subscribers with identity j in the group of subscribers are assigned; and wherein session keys are computed using a key derivation function for message encryption and decryption, a key being pseudo-randomly generated from the publishing key p_i, and a random number rnk; and wherein given the publishing key p_i, for the random number rnk, a publisher, i, in the group of publishers computes an encryption key s_k=AESp_i(rnk), further including the steps of:

upon receiving an encrypted message from publisher, I, in the group of publishers, a subscriber in the group of subscribers computes the publishing key p_i using the publishing master key pm; and from p_i a decryption key s_k is computed, the decryption key being able to be computed given the publishing master key, pm, and the random number, rnk; and wherein for a subscriber with identity j of group m, given a message broker B, a security association is established between B and j; and when B receives a message, B verifies whether the message comes from a publisher permitted for group m; and wherein after subscriber j is authenticated, subscriber j generates encryption Aj, which contains identity j, time stamp tsi, and j's address, wherein Aj is encrypted with j's authentication key a_j, and subscriber j sends a control message containing Ai and j's access-ticket Tj to message broker B who holds the access-ticket key tk given by an authentication server; and wherein for a given the authentication key a_i, and an encrypted message Xk=(Es_k(Mk), rnk, m), publisher i creates an E2E authenticator that contains identity i and a cryptographic hash of Xk using the publishing key p_i, {i∥Hp_i(Xk)}, and then encrypts the E2E authenticator using the authentication key, a_i; and wherein Xk, the encrypted E2E authenticator, and access-ticket Ti are together sent to message broker B, and upon reaching B, identity i and authentication key a_i are extracted from Ti using the assigned access-ticket key tk, and then identity i is extracted from Ea_i(i∥Hp_i(Xk)) using a_i, wherein if the two identities are equal, B newly encrypts the E2E authenticator {i∥Hp_i(Xk)}, using the authentication key a_j of subscriber j where Xk will be sent; and when an encrypted message, Xk, reaches message broker B, broker B can compute both the authentication key a_j and access right of subscriber j from Tj using tk, and then verify Aj using a_j, and upon verification, message broker B can establish a security a security association with subscriber j.

4. The method of claim 3, wherein when subscriber j receives $E_{a\text{-}j(i\|H_{p\text{-}i}}(X_k))$ together with $X_k$, it extracts {i∥$H_{p\text{-}i}(X_k)$} using its authentication key a_j wherein $H_{p\text{-}i}(X_k)$ is verified using the publishing key p_i.

5. An apparatus for providing secure communication between a group of publishers and a group of subscribers in a network, said apparatus comprising: a communications interface for enabling communications over a network; and a hardware processor which when programmed with executable program code is operable to:

assign a long-term key on per node basis to said publishers and subscribers during a node authentication phase; and assign a long-term authentication key on per node basis to said publishers and subscribers during node authentication phase: and assign an access-ticket on per node basis to said publishers and subscribers during a node authentication phase; and use said long term key to derive encryption keys from a random number per-message sent, wherein a publisher executes encryption using a separate key per message sent, and wherein a subscriber computes a decryption key when a message is received, computation of said decryption key being enabled by said long-term key that was assigned; and wherein session keys are computed using a key derivation function for message encryption and decryption, a key being pseudo-randomly generated from a publishing key and a random number; and wherein given publishing key p_i, for a random number rnk, a publisher i computes an encryption key s_k=AESp_i(rnk), further including the steps of:

upon receiving an encrypted message from publisher i, a subscriber computes the publishing key p_i using a publishing master key pm; and from p_i a decryption key s_k is computed, the decryption key being able to be computed given the publishing key p_i, and the random number rnk; and wherein for a subscriber with identity j of group m, given a message broker B, a security association is established between B and j; and when B receives a message, B verifies whether the message comes from a publisher permitted for group, group m; and wherein after a subscriber, with identity j, in a group of subscribers is authenticated, subscriber j generates encryption Aj, which contains identity j, time stamp tsj, and j's address, wherein Aj is encrypted with j's authentication key a_j, and subscriber j sends a control message containing Aj and j's access-ticket Tj to message broker B who holds an access-ticket key tk given by an authentication server, and when the message reaches message broker B, broker B can compute both the authentication key a_j and access right of subscriber j from Tj using tk, and then verify Aj using a_j and upon verification, message broker B can establish a security association with subscriber j; and wherein for a given assigned authentication key a_i, and an encrypted message Xk=(Es_k(Mk), rnk, m), publisher i creates an E2E authenticator that contains identity i and a cryptographic hash of Xk using the assigned publishing key p_i, i||Hp_i(Xk) {i||Hp_i(Xk)}, and then encrypts the authenticator using a_i; and wherein Xk, the encrypted E2E authenticator, and access-ticket Ti are together sent to message broker B, and upon reaching B, identity I, and authentication key a_i are extracted from Ti using the access-ticket key tk, and then identity i from Ea_i(i||HP_i(Xk)) using a_i, wherein if the two identities are equal, B newly encrypts the E2E authenticator {i||Hp_i(Xk)} using the assigned authentication key, a_j, of subscriber j where Xk will be sent.

6. The apparatus of claim 5, wherein message brokers multicast messages from publishers in a group to subscribers in the group, wherein for publisher subscriber groups, authentication servers are responsible for member authentication and key distribution to publisher, subscriber, or message broker members, wherein in a group, a member is authenticated and then assigned keys; and a message broker authenticated for a group maintaining security state for subscribers authenticated for that group and when a message broker receives a message, it verifies if the source of the message is a publisher permitted to access the group.

7. The apparatus of claim 6, wherein for a group, authentication servers distribute four kinds of long term keys: a single publishing master key, a publishing key per publisher, a single access-ticket key, and an authentication key per member and for a group m, given a single publishing master key pm, a publisher with identity i is assigned a publishing key $p\_i = AES_{pm}(i)$.

8. The apparatus of claim 7, wherein a publishing master pm is given to all subscribers and p_i and pm are subsequently used to compute keys for message encryption and decryption respectively.

9. The apparatus of claim 1, wherein when subscriber j receives $E_{a\text{-}j}(i\|H_{p\text{-}i}(X_k))$ together with $X_k$, it extracts $\{i\|H_{p\text{-}i}(X_k)\}$ using its authentication key a_j wherein $H_{p\text{-}i}(X_k)$ is verified using the publishing key p_i.

* * * * *